(12) United States Patent
Clarke

(10) Patent No.: US 6,174,405 B1
(45) Date of Patent: Jan. 16, 2001

(54) LIQUID CRYSTAL POLYMER IN SITU COATING FOR CO-CURED COMPOSITE STRUCTURE

(75) Inventor: James A. L. Clarke, Greenlawn, NY (US)

(73) Assignee: Northrop Grumman Corporation, Los Angeles, CA (US)

( * ) Notice: Under 35 U.S.C. 154(b), the term of this patent shall be extended for 0 days.

(21) Appl. No.: 09/151,536

(22) Filed: Sep. 11, 1998

(51) Int. Cl.$^7$ ........................................ B32B 31/00
(52) U.S. Cl. .................. 156/289; 156/230; 156/307.1
(58) Field of Search ..................... 156/230, 241, 156/278, 289, 307.3, 307.1, 308.2; 252/299.01

(56) References Cited

U.S. PATENT DOCUMENTS

| | | | |
|---|---|---|---|
| 4,239,571 | * 12/1980 | Cobb | 156/289 X |
| 4,933,131 | 6/1990 | Okey et al. | 264/255 |
| 5,049,342 | 9/1991 | Scanlon et al. | 264/250 |
| 5,219,502 | * 6/1993 | Zaidi et al. | |
| 5,227,456 | * 7/1993 | Shepherd et al. | |
| 5,248,530 | * 9/1993 | Jester et al. | |
| 5,352,312 | * 10/1994 | Guillot | 252/299.01 X |
| 5,364,669 | 11/1994 | Sumida et al. | 428/1 |
| 5,364,905 | 11/1994 | Bauer et al. | 525/53 |
| 5,427,712 | * 6/1995 | Nakamura et al. | 252/299.01 |
| 5,439,541 | * 8/1995 | Economy | |
| 5,601,884 | 2/1997 | Ohnishi et al. | 428/1 |
| 5,609,922 | 3/1997 | McDonald | 427/447 |
| 5,620,755 | 4/1997 | Smith, Jr. et al. | 428/1 |
| 5,670,262 | 9/1997 | Dalman | 428/458 |
| 5,681,624 | * 10/1997 | Moriya | |

* cited by examiner

*Primary Examiner*—Curtis Mayes
(74) *Attorney, Agent, or Firm*—Terry J. Anderson; Karl J. Hoch, Jr.

(57) ABSTRACT

Novel liquid crystal polymer coatings and methods of applying the same. The liquid crystal polymers (LCPs) comprise high-melting point thermal plastics selected from the group consisting of co-polyesters, co-polyesteramides, or multiple monomer wholly aromatic polyesters. In the preferred embodiment, the LCPs may be chemically modified to provide greater hardness. The method of the present invention involves the thermal spraying of an LCP on the tooling used for curing composite structures.

6 Claims, 1 Drawing Sheet

LIQUID CRYSTAL POLYMER IN SITU COATING FOR CO-CURED COMPOSITE STRUCTURE

FIELD OF THE INVENTION

The present invention relates generally to compositions and methods for forming coatings upon substrates, and more particularly, liquid crystal polymers for in situ coating of co-cured composite structures and methods of applying the same.

BACKGROUND OF THE INVENTION

As is well known, metallic and composite structures mounted upon the exterior of ships and aircraft can experience significant degradation and damage due to their exposure to erosion-corrosion attack. In this regard, such structures are constantly subjected to oxidation, moisture, fouling, salt-spray, UV radiation, chemicals, and high and low temperatures, among other things, that can cause such structures to experience significant degradation and damage over time. As a consequence, such structural components must be constantly repaired or replaced to thus prevent the possibility that a given vessel or aircraft will be damaged permanently, if not destroyed.

To attempt to prevent the damage caused by fatigue and environmental exposure on such composite and metallic components, a variety of coating agents and methods of applying the same to such components have been developed to improve their durability. Among such processes well-known to those skilled in the art is thermal spraying, which comprises insertion of feed stock particles, typically of a polymer-like material, into a high-energy heat source that propels the particles, while in a semi-liquid state, onto the surface of the component sought to be protected. Once propelled onto the surface sought to be protected, the particles cool, and through repeated deposition of many such particles, a deposit builds up. Among such substances used for forming protective coatings via thermal spraying include polyurethane, polyethylene, polyacrylonitrile, polyvinylchloride and ethylene vinylalcohol.

While each of the aforementioned compounds are suited for application via thermal spraying, such compounds typically fail to provide an adequate degree of protection to the surface upon which they are applied. In this regard, each of the aforementioned compounds fails to provide a sufficiently proficient barrier against either oxygen or water vapor permeation. For example, while ethylene vinylalcohol provides a high degree of resistance to oxygen permeation, such compound generally fails to provide a high enough degree of resistance to water vapor permeation. Polyvinyldychloride, on the other hand, provides a high degree of resistance to water vapor permeation, but a substantially lesser degree of resistance to oxygen permeation. As is well-known, however, the ability of either water or oxygen to permeate through a given coating and directly contact the surface of a metallic or composite structure can substantially damage such structure over time.

In addition to failing to provide a sufficient barrier to either oxygen permeation and/or water vapor permeation, such protective coatings further typically fail to provide a sufficient degree of resistance to fouling and chemical exposure. Likewise, such coatings further often fail to posses sufficient dimensional stability and hardness for use in high fatigue and environmental exposure application.

Accordingly, there is thus a need in the art for a composition and method of applying the same that can be utilized to form a protective coating upon a metallic or composite structure that can provide a higher degree of protection to the surface thereof from chemicals and environmental exposure than prior art coating compositions. There is further a need for improved coating compositions that, in addition to providing a greater degree of protection than prior art coating compositions, may be quickly and easily applied as per convention coating techniques. A still further need exists in the art for such coating compounds that may be formulated from nontoxic, readily available and relatively inexpensive chemical compositions.

SUMMARY OF THE INVENTION

The present invention addresses and alleviates the above-identified deficiencies in the art. Specifically, the present invention is directed to novel liquid crystal polymers for use in forming protective coatings upon composite and metallic structures that are subjected to fatigue and environmental exposure, as well as methods of applying the same. The Liquid Crystal Polymers (LCPs) comprise high-melting point thermal plastics selected from the group consisting of co-polyesters, co-polyesteramides, and multiple monomer wholly aromatic polyesters that are utilized in an isotropic film form. In more refined embodiments, such polymers may be modified to include rigid elements, such as rod-like monomers, incorporated into the backbones thereof to thus impart an impervious microstructure and increased hardness and impact strength. Advantageously, the LCPs of the present invention contain neither volatile organic compounds (VOC's) nor heavy metals, such as lead and the like.

The method of the present invention is directed to applying the aforementioned novel coating materials onto a given substrate. According to a preferred embodiment, the method comprises the initial step of applying a layer of a release agent, such as TEFLON® or FREKOTE®, to the tooling surface to be used for curing the composite structure. Thereafter, the LCP is thermally sprayed upon the surface via conventional spraying techniques or placed on the tool as a thin film. Preferably, the LCP is applied to a thickness from 0.002 to 0.010 inches. Thereafter, the composite laminating material for forming the structural component is applied to the coated tooling surface and cured therewithin. In an optional step, an adhesive may be applied between the uncured composite and coated tooling surface prior to curing. After curing, the structure with the LCP coating formed thereon is removed from the tooling for use in final assembly.

It is therefore an object of the present invention to provide novel coating compositions and methods for applying the same that are capable of forming a more durable and protective coating when applied to a given metallic or composite structure than prior art coating compositions and techniques.

Another object of the present invention is to provide novel coating compositions and methods of applying the same that can provide a higher degree of protection to substrates coated therewith when subjected to erosion and/or corrosion attack.

Another object of the present invention is provide novel coating compositions and methods of applying the same that can be easily and readily utilized and applied using existing coating technology.

Another object of the present invention is to provide novel coating compositions and methods of applying the same that are non-toxic and pose no threat to the environment.

Still further objects of the present invention include providing novel coating compositions and methods of applying the same that are relatively inexpensive, impart greater protection from oxygen and moisture permeation, have greater dimensional stability and hardness, and provide greater protection from chemical exposure than prior art compositions and methods.

BRIEF DESCRIPTION OF THE DRAWINGS

These, as well as other features of the present invention, will be more apparent from the following description and figures, wherein.

DETAILED DESCRIPTION OF THE PREFERRED INVENTION

Figure 1:
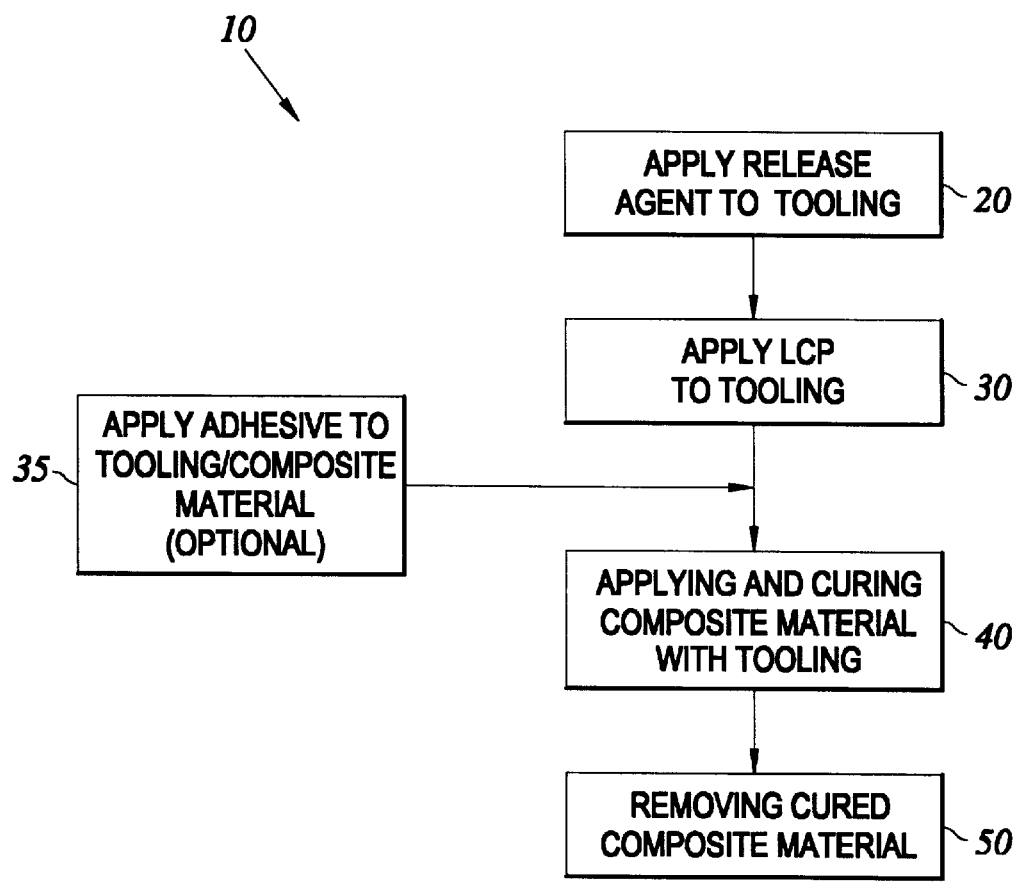
FIG. 1 schematically illustrates the steps utilized in applying the novel coating compositions of the present invention.

The detailed description set forth below in connection with the appended drawings is intended as description of the presently preferred embodiments of the invention and is not intended to represent the only forms in which the present invention may be constructed or utilized. It is to be understood, however, that the same or equivalent functions and sequences may be accomplished by different embodiments that are also intended to be encompassed within the spirit and scope of the invention.

As is well known, structural components utilized to construct the exterior surfaces of commercial and military ships and aircraft can experience significant degradation and damage due to exposure to the external environment. In this regard, such structural components, which are typically fabricated from metallic or composite materials, are constantly subjected to physical and chemical forces that can cause such structures to deteriorate over time. Among the environmental forces encountered by such structural components include oxidation, moisture, fouling, ultraviolet radiation, corrosive chemicals, and extremes in high and low temperatures. As a consequence, such structural components must necessarily be repaired and/or replaced, which thus substantially increases the cost and labor involved in maintaining such vessels and aircraft.

While attempts have been made to prolong the life of such structural components, typically by applying a protective coating thereto, such attempts, to date, have proven ineffective. In this regard, such prior art coatings have proven ineffective in resisting erosion and corrosive forces and further lack certain physical properties, such as dimensional stability and hardness, to enable such coatings to provide an optimal degree of protection. Likewise, prior art coatings are typically toxic in nature and are often formulated with volatile organic compounds and/or heavy metals, such as lead. As a result, such compositions have not only the draw back of not providing an adequate degree of protection, but further generate substantial hazardous waste.

The novel coating compounds and methods of applying same that are the subject of the present invention are specifically directed toward alleviating the aforementioned deficiencies in the prior art. The coating compositions of the present invention comprise liquid crystal polymers selected from the group comprising co-polyesters, co-polyesteramides, or multiple monomer wholly aromatic polyesters. Among the representative LCP products currently available for use in the practice of the present invention include XYDAR-RT-300, XYDAR-SRT-700, and XYDARSRT-900, produced by Amoco; VECTRA A950, VECTRA L950 and VECTRA E950L, produced by Hoechst Celanese, and Zenite 100, Zenite 600, Zenite 700 and Zenite 800 manufactured by Dupont. The liquid crystal polymers are all characterized as being high-melting point thermal plastics. As may be desired in some applications well known to those skilled in the art, certain molecular modifications may be made to the polymer backbone of the liquid crystal polymers to impart desired characteristics, such as greater dimensional stability and hardness. Advantageously, the liquid crystal polymers of the present invention do not contain any volatile organic compounds or heavy metals, such as lead and the like, which is typical of prior art coating compositions. Moreover, the liquid polymers of the present invention provide tremendous advantages insofar as the same may be applied via conventional thermal spraying, discussed more fully below.

Referring now to the FIGURE, the process for applying the liquid crystal polymers of the present invention is schematically illustrated in FIG. 1. As illustrated, the process 10 comprises the initial step 20 of coating the surface of the tooling used for curing the composite structure(s) with a release agent, such as TEFLON®, FREKOTE®, or any of a wide variety of such agents well known in the art. Thereafter, the LCP is thermally sprayed upon the tooling surface and on top of the release agent in a second step 30.

With respect to application of the liquid crystal polymer, it should be understood that any such LCP be utilized in an isotropic film form. To achieve that end, powdered high molecular weight LCP, when applied via thermal spraying, results in a near isotropic film on the sprayed object. As is well known to those skilled in the art, thermal spraying involves the insertion of feed stock particles into a high-energy heat source that propels the particles onto the tooling surface where the particles cool. After repeated deposition of many such particles a deposit or coating is caused to form thereupon.

Typically, thermal spraying is performed via a thermal spray gun, for example, a Metro 3MR having a GP type nozzle affixed thereto. The thermal spray gun sustains a stable, non-transferred electric arc between a thoriated tungsten cathode and an annular water-cooled cooper anode. A gas, such as argon or other inert gas, complimented by a small portion of an enthalpy enhancing gas, such as hydrogen, is introduced at the back of the gun's interior such that gas swirls in a vortex and out of the front end of the anode nozzle. The electric arc from the cathode to the anode completes the circuit, thus forming a flame that axially rotates due to the vortex momentum of the gas. The temperature of the flame just outside the nozzle exit is high enough to melt the LCP. The flame temperature drops off rapidly from the exit of the anode and, therefore, causes the LCP, which is typically in powder form, to be introduced at the hottest part of the flame generated by the thermal spray gun.

As is well known to those skilled in the art, a number of variables can influence the quality of coatings formed by thermal spraying including, but not limited to, the gas composition, flow rate, power and power injection of the spray, the particle size, the distribution, morphology, and melting-point of the liquid crystal polymer feed stock, the chemistry, roughness and temperature of the substrate and the deposit properties of the liquid crystal polymer, including the porosity and density thereof. The aforementioned perimeters may be selectively adjusted as per techniques well known to those skilled in the art so that a proper coating may be applied that is ideally suited for a given application.

At present, it is believed that the use of LCP powder having a particle size of approximately 50 microns is best suited for practice of the present invention. LCP manufacturers utilizing solid state polymerization can produce powder form that can be ground to the desired particle size. LCP manufacturing utilizing melt state polymerization, however, produces a pill that cannot be ground to the desired particle size and, as a consequence, results in a product having undesirable fibrous characteristics. Alternatively though, low-molecular weight LCP, produced using the melt process can be ground to particle size and then polymerized at elevated temperatures, typically between 400 degrees to 600 degrees fahrenheit for 4–8 hours prior to thermal spraying.

Once the liquid crystal polymer has been applied to the tooling used for curing composite structures, the composite material from which the structure is formed, which may comprise materials such as fiber reinforced polymers, is then cured in a third step 40. The bonded composite material having the liquid crystal polymer coating formed thereon is then removed in situ via step 50, and may be utilized in final assembly. As will be recognized by those skilled in the art, in some applications it may be necessary to apply an adhesive, via optional step 35, between the film and the uncured composite structural part prior to adhering. As will be understood, such adhesive may be necessary to form a sufficient bond between the LCP film and the composite structure sought to be protected therewith.

Advantageously, the application of the liquid crystal polymer can be utilized with composites of any size or shape. In this regard, the liquid crystal polymers of the present invention are particularly well suited for composites formed from fiber reinforced polyimide or fiber reinforced epoxy. The liquid crystal polymer of the present invention may further be directly applied to metallic structures, such as those utilized in aerospace applications.

The unique application of the liquid crystal polymer of the present invention for coating applications as discussed above impart to the structural component excellent resistance to chemical exposure, fouling, and heat resistance. The liquid crystal polymers are further substantially more impervious to oxygen and water than other like compounds frequently utilized to form protective coatings, including, but not limited to, polyvinyldychloride, ethylene vinylalcohol, polyacrylonitril, polyethylene and polyurethane.

The liquid crystal polymer of the present invention further provides substantial stability and hardness than prior art coating compositions. For example, LCP coatings of the present invention, when applied as per the aforementioned technique on aerospace componentry, had been fatigue cycled to 6,000 microinches per inch strain without any cracking. Such coating, as thermally sprayed upon a composite laminate, has further been subjected to accelerated aging at 350 fahrenheit and cryogenic temperatures without degradation.

It is to be understood that the individual elements and components of each above-described embodiment may be interchanged among and/or incorporated into any and all embodiments of the invention, even though certain elements or components may have been mentioned or described herein with respect certain embodiment(s) of the invention only.

It is to be further understood that various additions, deletions, modifications and alterations may be made to the above-described embodiments without departing from the intended spirit and scope of the present invention. Accordingly, it is intended that all such additions, deletions, modifications and alterations be included within the scope of the following claims.

What is claimed is:

1. A method of applying a protective coating to a surface of a composite structure comprising the steps:
   a) providing (i) a thermoplastic liquid crystal polymer wherein said polymer is selected from the group consisting of co-polyesters, co-polyestersamides, and wholly aromatic polyesters; (ii) a composite laminating material; (iii) tooling for curing said composite laminating material; (iv) a release agent; and (v) an adhesive;
   b) applying said release agent to said tooling;
   c) applying a layer of said thermoplastic liquid crystal polymer upon said tooling pre-treated with said release agent;
   d) applying a layer of said adhesive upon said layer of thermoplastic material applied in step c);
   e) applying said composite laminating material to said tooling treated in step d;
   f) curing the structure upon said tooling; and
   g) removing said structure from the tooling.

2. The method of claim 1 wherein in step a), said release agent comprises polytetrafluoroethene.

3. The method of claim 1 wherein in step c), said liquid crystal thermoplastic polymer is applied to a thickness ranging from 0.002 to 0.010 inches.

4. The method of claim 1 wherein in step e), said tooling is bagged once said composite laminating material has been applied thereto.

5. The method of claim 1, where in step c) said liquid crystal thermoplastic polymer is utilized in an isotropic film form.

6. A method of applying a protective coating to a surface of a composite structure comprising the steps:
   a) providing (i) a thermoplastic liquid crystal polymer wherein said polymer is selected from the group consisting of co-polyesters, co-polyestersamides, and wholly aromatic polyesters; (ii) a composite laminating material; (iii) tooling for curing said composite laminating material; (iv) a release agent;
   b) applying said release agent to said tooling;
   c) applying a layer of said thermoplastic liquid crystal polymer upon said tooling pre-treated with said release agent;
   d) applying said composite laminating material to said tooling treated in step b);
   e) bagging said tooling having said composite laminating material applied thereto;
   f) curing the structure applied upon said tooling; and
   g) removing said structure from the tooling.

* * * * *